(12) United States Patent
Singh et al.

(10) Patent No.: US 10,229,633 B2
(45) Date of Patent: Mar. 12, 2019

(54) METHODS AND APPARATUS FOR INTEGRATING NEAR FIELD COMMUNICATION ANTENNA WITH DISPLAY PIXEL ACTIVATION LINE

(71) Applicant: Intel Corporation, Santa Clara, CA (US)

(72) Inventors: Amit Singh, Los Angeles, CA (US); Seung Jun Lee, San Jose, CA (US); Paul Beaucourt, Santa Clara, CA (US); Aycan Erentok, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/456,005

(22) Filed: Mar. 10, 2017

(65) Prior Publication Data

US 2018/0261152 A1    Sep. 13, 2018

(51) Int. Cl.
| | |
|---|---|
| *G09G 3/36* | (2006.01) |
| *G06F 3/041* | (2006.01) |
| *G09G 3/3225* | (2016.01) |
| *G09G 3/3266* | (2016.01) |
| *G09G 3/3275* | (2016.01) |

(52) U.S. Cl.
CPC ......... *G09G 3/3225* (2013.01); *G09G 3/3266* (2013.01); *G09G 3/3275* (2013.01); *G09G 3/3677* (2013.01); *G09G 3/3688* (2013.01); *G06F 3/041* (2013.01); *G09G 2310/08* (2013.01); *G09G 2330/021* (2013.01)

(58) Field of Classification Search
CPC .. G09G 3/3225; G09G 3/3266; G09G 3/3275; G09G 3/3677; G09G 3/3688; G09G 2310/08; G09G 2330/021; G06F 3/041
See application file for complete search history.

(56) References Cited

U.S. PATENT DOCUMENTS

| | | | |
|---|---|---|---|
| 9,178,572 B1* | 11/2015 | Zhang | H01Q 1/44 |
| 2002/0093473 A1* | 7/2002 | Tanaka | G09G 3/3648 |
| | | | 345/87 |
| 2003/0062889 A1* | 4/2003 | Ely | G01D 5/2073 |
| | | | 324/207.17 |
| 2009/0167699 A1 | 7/2009 | Rosenblatt et al. | |
| 2011/0254795 A1* | 10/2011 | Chen | G06F 3/0412 |
| | | | 345/173 |
| 2015/0020081 A1* | 1/2015 | Cho | G06F 9/542 |
| | | | 719/318 |
| 2015/0185928 A1 | 7/2015 | Son et al. | |
| 2016/0042676 A1* | 2/2016 | Berkeley | G09G 3/006 |
| | | | 345/589 |

FOREIGN PATENT DOCUMENTS

| | | |
|---|---|---|
| CA | 2949320 | 12/2015 |
| EP | 2620845 | 7/2013 |
| WO | 2015188323 | 12/2015 |

\* cited by examiner

*Primary Examiner* — Stephen G Sherman

(74) *Attorney, Agent, or Firm* — Hanley, Flight & Zimmerman LLC

(57) ABSTRACT

Methods and apparatus are disclosed for integrating a near field communication antenna with a display pixel activation line. The near field communication antenna can facilitate wireless communication between an electronic device and other devices that are nearby.

17 Claims, 9 Drawing Sheets

METHODS AND APPARATUS FOR INTEGRATING NEAR FIELD COMMUNICATION ANTENNA WITH DISPLAY PIXEL ACTIVATION LINE

FIELD OF THE DISCLOSURE

This disclosure relates generally to near field communication, and in particular, to methods and apparatus for integrating a near field communication antenna with a display pixel activation line.

BACKGROUND

Modernly, electronic devices have become part of the daily lives of most people. While electronic devices can simplify our lives, they can also cause difficulties when they can't communicate with other devices. Near Field Communication (NFC) can help by providing for wireless communication between electronic devices and other devices that are nearby.

Also, in recent years, there has been a trend for electronic devices to become available in thinner form factors. There are many reasons for this, for example, consumer demand for thinner devices. While thinness can be desirable, it can also cause difficulties in adding Near Field Communication (NFC) capabilities to electronic devices.

DETAILED DESCRIPTION

Methods and apparatus are disclosed for integrating a near field communication antenna with a display pixel activation line. The near field communication (NFC) antenna can facilitate wireless communication between an electronic device and other devices that are nearby. Integration of the near field communication antenna with the display pixel activation line can help to avoid assembly problems, costs, size and space constraints, and other problems that can otherwise be associated with alternative arrangements using a near field communication antenna that is separate from the display pixel activation line.

Figure 1:
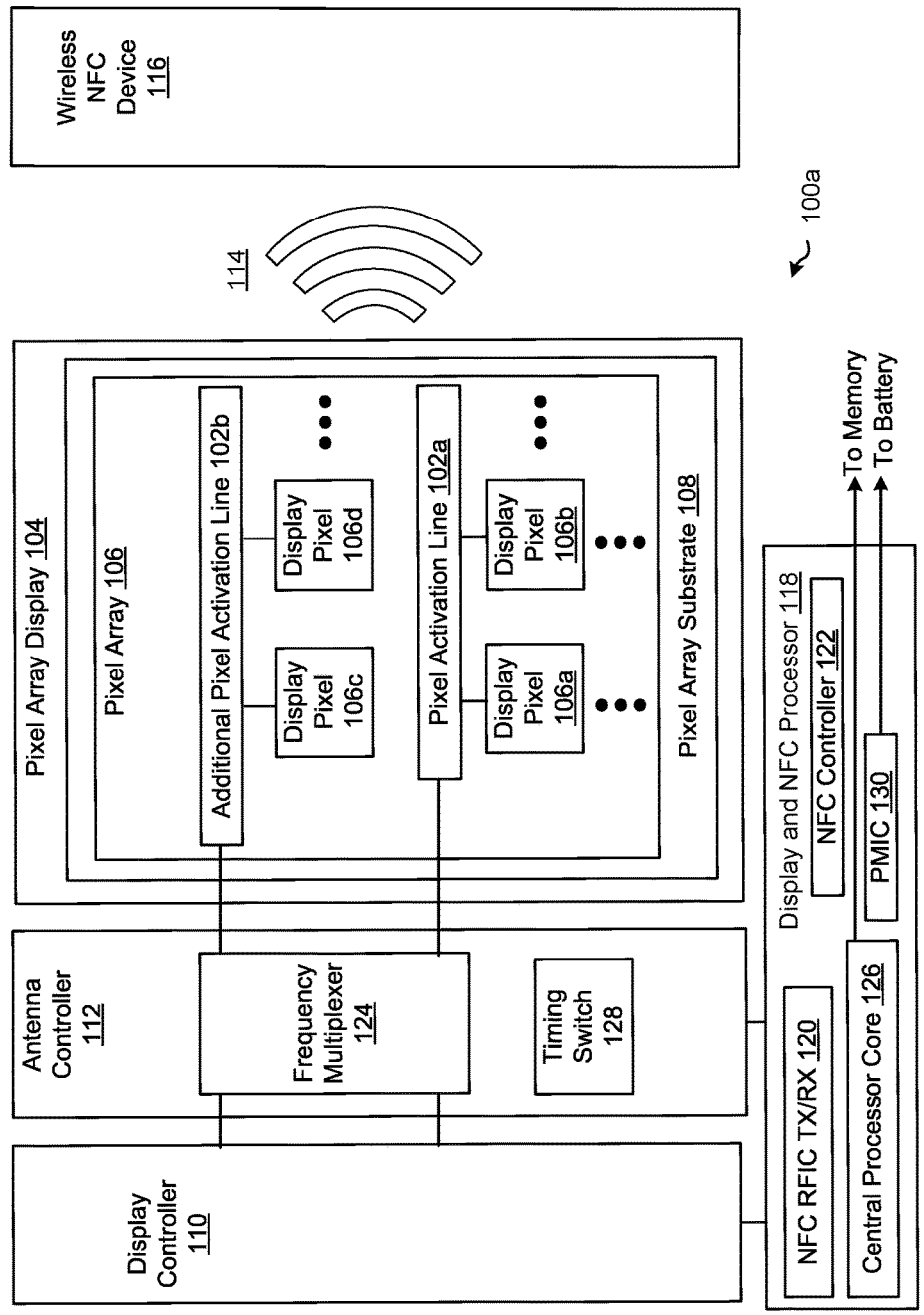
FIG. 1 is a block diagram of an example system in which a near field communication antenna is integrated with a pixel activation line of a pixel array display.

FIG. 1 is a block diagram of an example apparatus 100a in which a near field communication antenna is integrated with a pixel activation line 102a of a pixel array display 104. The example apparatus 100a can be wrist wearable. The pixel array display 104 can include a pixel array 106 disposed on a (e.g., planar) pixel array substrate 108. The pixel array 106 can include a first display pixel 106a and a second display pixel 106b, as well as a first additional display pixel 106c and a second additional display pixel 106d. The first display pixel 106a and the second display pixel 106b, as well as a first additional display pixel 106c and a second additional display pixel 106d, can be disposed on the pixel array substrate 108. As shown in the example of FIG. 1, the pixel activation line 102a is disposed on the (e.g., planar) pixel array substrate 108 between the first pixel 106a and the first additional pixel 106c. The pixel activation line 102a can be a metal line. The pixel activation line 102a can have a resistivity of less than one ohm per meter. The foregoing can facilitate transmission of the wireless communication signal 114 over the pixel activation line 102a.

A display controller 110 can control the pixel array display 104. For example, the pixel activation line 102a can carry a display activation signal from the display controller to activate visual display of at least one of the first display pixel 106a and the second display pixel 106b. For example, the pixel activation line 102a can be coupled between the display controller 110 and at least one of the first display pixel 106a and the second display pixel 106b of the pixel array 106 to activate visual display of the at least one of the first display pixel 106a and the second display pixel 106b. For example, the pixel activation line 102a can be in circuit with at least one of the first display pixel 106a and the second display pixel 106b of the pixel array 106 to activate visual display of the at least one of the first display pixel 106a and the second display pixel 106b. Further, the antenna controller 112 can transmit the wireless communication signal 114 through the pixel activation line 102a. For example, the antenna controller 112 can be coupled with the pixel activation line to couple the wireless communication signal 114 through the pixel activation line 102a. The wireless communication signal 114 can include a radio frequency (RF) burst having a carrier frequency of the RF burst of 13.56 megahertz (e.g., near field communication signal 114). As such, the wireless communication signal 114 is invisible to the human eye. However, in the system shown in FIG. 1, the wireless communication signal 114 is representatively illustrated in FIG. 1 by arches wirelessly radiating between the pixel activation line 102a that is acting as the integrated NFC antenna and a nearby wireless near field communication device 116. For example, the system shown in FIG. 1 can include the example wrist wearable apparatus 100a in wireless communication with the nearby wireless near field communication device 116.

In the illustrated example, the pixel activation line 102a acts as the integrated NFC antenna in a wireless transmitter mode to transmit the wireless communication signal 114 from pixel activation line 102a to the nearby wireless near field communication device 116. The pixel activation line 102a of this example also acts as the integrated NFC antenna in a wireless receiver mode to receive the wireless communication signal 114 through pixel activation line 102a from the nearby wireless near field communication device 116. The antenna controller 112 can be coupled with a display and NFC processor 118. The display and NFC processor 118 can include an NFC radio frequency (RF) integrated circuit (IC) transmitter and receiver (TX/RX) 120 (e.g., NFC RF IC TX/RX 120) to facilitate the pixel activation line 102a acting as the integrated NFC antenna in the wireless transmitter mode and/or the wireless receiver mode. The display and NFC processor 118 can include a near field communication processor 122 (e.g., NFC controller 122). The NFC controller 122 can be coupled with the antenna controller 112, for example via that the NFC RF integrated circuit (IC) transmitter and receiver (TX/RX) 120, to process the near field communication signal 114.

Further, the antenna controller 112 can include a frequency multiplexer 124 The frequency multiplexer 124 can multiplex the wireless communication signal 114 and the display activation signal over the pixel activation line 102a. For example, the frequency multiplexer 124 can be coupled with the pixel activation line 102a to multiplex the wireless communication signal 114. For example, the frequency multiplexer 124 can multiplex the near field communication signal 114 between the pixel activation line 102a and the near field communication processor 122 (e.g., NFC controller 122) based on the wireless communication signal frequency (e.g., based on the carrier frequency of the RF burst of 13.56 megahertz). Additionally, the frequency multiplexer 124 can facilitate isolating the near field communication signal 114 from the display controller 110 based on the wireless communication signal frequency (e.g., based on the carrier frequency of the RF burst of 13.56 megahertz).

As shown in the example of FIG. 1, the display and NFC processor 118 can include a central processor core 126. The central processor core 126 can be coupled to memory external to the central processor core 126. Further, the central processor core 126 can transmit display information to the display controller, which in turn can control the pixel array display 104 to visually display the display information on the pixel array display 104. In particular, the display controller 110 can be coupled with the first display pixel 106a and the second display pixel 106b of the pixel array 106 via the pixel activation line 102a. The display activation signal can be transmitted from the display controller 110 to the first display pixel 106a via the pixel activation line 102a, for example, to activate visual display of the first display pixel 106a of the pixel array 106. Similarly, the display activation signal can be transmitted from the display controller 110 to the second display pixel 106b via the pixel activation line 102a, for example, to activate visual display of the second display pixel 106b of the pixel array 106. The display activation signal can have a display activation signal frequency (e.g., a video band frequency of the display activation signal). The display controller 110 can be coupled with the pixel activation line 102a through the frequency multiplexer 124 to activate visual display of the at least one of the first display pixel 106a and the second display pixel 106b in response to the display activation signal and a corresponding display activation signal frequency. Further, the frequency multiplexer 124 can multiplex the display activation signal between the display controller 110 and the pixel activation line 102a based on the display activation signal frequency. Moreover, the frequency multiplexer 124 can facilitate isolating the display activation signal from the NFC RF integrated circuit (IC) transmitter and receiver (TX/RX) 120, and from the near field communication processor 122 based on the display activation signal frequency. The wireless communication signal frequency (e.g., the carrier frequency of the RF burst of 13.56 megahertz) is higher in frequency than the display activation signal frequency (e.g., higher in frequency than the video band frequency of the display activation signal).

As shown in the example of FIG. 1, the antenna controller 112 can include a timing switch 128. The timing switch 128 can select the display activation signal for transmission on the pixel activation line 102a when the at least one of the first display pixel and the second display pixel is to be activated. For example, the timing switch can be coupled with the pixel activation line 102a. The timing switch 128 can select the display activation signal for coupling between the pixel activation line 102a and the display controller 110 when at least one of the first display pixel 106a and the second display pixel 106b is to be activated. The timing switch 128 can facilitate isolating the display activation signal from the NFC RF integrated circuit (IC) transmitter and receiver (TX/RX) 120, and from the near field communication processor 122. Further, the timing switch 128 can select the wireless communication signal 114 for transmission on the pixel activation line 102a, while the display activation signal is not selected by the timing switch 128. For example, the timing switch 128 can select the wireless communication signal 114 for coupling between the pixel activation line 102a and the near field communication processor 122, while the display activation signal is not selected by the timing switch 128. For example, the timing switch 128 can facilitate isolating the near field communication signal 114 from the display controller 110, when the wireless communication signal 114 is selected by the timing switch 128 (e.g., while the display activation signal is not selected by the timing switch 128).

Further, the foregoing discussions of the pixel activation line 102a acting as the antenna for the wireless communication signal 114 can likewise be applied to an additional pixel activation line 102b acting as the antenna for the wireless communication signal 114. For example, the additional pixel activation line 102b can be a metal line. The additional pixel activation line 102b can have a resistivity of less than one ohm per meter. The foregoing can facilitate transmission of the wireless communication signal 114 over the additional pixel activation line 102b.

As shown in the example of FIG. 1, the additional pixel activation 102b can be disposed on the (e.g., planar) pixel array substrate 108. The additional pixel activation 102b can carry the display activation signal from the display controller to activate visual display of at least one of the first additional display pixel 106c and the second additional display pixel 106d. For example, the additional pixel activation line 102b can be coupled between the display controller and at least one of the first additional display pixel 106c and the second additional display pixel 106d of the pixel array 106 to activate visual display of at least one of the first additional display pixel 106c and the second additional display pixel 106d. For example, the additional pixel activation line 102b can be in circuit with the first additional display pixel 106c and the second additional display pixel 106d of the pixel array 106 to activate visual display of at least one of the first additional display pixel 106c and the second additional display pixel 106d. Further, the antenna controller 112 can transmit the wireless communication signal 114 through the additional pixel activation line 102b. For example, the antenna controller 112 can be coupled with the additional pixel activation line 102b to couple the wireless communication signal 114 through the additional pixel activation line 102b.

The additional pixel activation line 102b can act as the (and/or a second) integrated NFC antenna in the wireless transmitter mode to transmit the wireless communication signal 114 from additional pixel activation line 102b to the nearby wireless near field communication device 116. The additional pixel activation line 102b can also act as the (and/or a second) integrated NFC antenna in the wireless receiver mode to receive the wireless communication signal 114 through additional pixel activation line 102b from the nearby wireless near field communication device 116. The display and NFC processor 118 can include the NFC RF integrated circuit (IC) transmitter and receiver (TX/RX) 120 (e.g., NFC RF IC TX/RX 120) to facilitate the additional pixel activation line 102b acting as the integrated NFC antenna in the wireless transmitter mode and the wireless receiver mode.

Further, the frequency multiplexer 124 can multiplex the wireless communication signal 114 and the display activation signal over the additional pixel activation line 102b. For example, the frequency multiplexer 124 can be coupled with the additional pixel activation line 102b to multiplex the wireless communication signal 114. For example, the frequency multiplexer 124 can multiplex the near field communication signal 114 between the additional pixel activation line 102b and the near field communication processor 122 (e.g., NFC controller 122) based on the wireless communication signal frequency (e.g., based on the carrier frequency of the RF burst of 13.56 megahertz).

Additionally, the display controller 110 can be coupled with the first additional display pixel 106c and the second additional display pixel 106d of the pixel array 106 via the additional pixel activation line 102b. The display activation signal can be transmitted from the display controller 110 to the first additional display pixel 106c via the additional pixel activation line 102b, for example, to activate visual display of the first additional display pixel 106c of the pixel array 106. Similarly, the display activation signal can be transmitted from the display controller 110 to the second additional display pixel 106d via the additional pixel activation line 102b, for example, to activate visual display of the second additional display pixel 106d of the pixel array 106. The display controller 110 can be coupled with the additional pixel activation line 102b through the frequency multiplexer 124 to activate visual display of the at least one of the first additional display pixel 106c and the second display pixel 106d in response the display activation signal having the display activation signal frequency. Further, the frequency multiplexer 124 can multiplex the display activation signal between the display controller 110 and the additional pixel activation line 102b based on the display activation signal frequency.

As shown in the example of FIG. 1, the timing switch 128 can be coupled with the additional pixel activation line 102b. The timing switch 128 can select the display activation signal for transmission on the additional pixel activation line 102b when the at least one of the first additional display pixel 106c and the second additional display pixel 106d is to be activated. For example, the timing switch 128 can select the display activation signal for coupling between the additional pixel activation line 102b and the display controller 110 when at least one of the first additional display pixel 106c and the second additional display pixel 106c is to be activated. The timing switch 128 can facilitate isolating the display activation signal from the NFC RF integrated circuit (IC) transmitter and receiver (TX/RX) 120, and from the near field communication processor 122. For example, the timing switch 128 can select the wireless communication signal 114 for transmission on the additional pixel activation line 102b, while the display activation signal is not selected by the timing switch 128. Moreover, the timing switch 128 can select the wireless communication signal 114 for coupling between the additional pixel activation line 102b and the near field communication processor 122, while the display activation signal is not selected by the timing switch 128. For example, the timing switch 128 can facilitate isolating the near field communication signal 114 from the display controller 110, when the wireless communication signal 114 is selected by the timing switch 128 (e.g., while the display activation signal is not selected by the timing switch 128).

As shown in the example of FIG. 1, the display and NFC processor 118 can include a power management integrated circuit 130 (e.g., PMIC 130). The power management integrated circuit 130 can be coupled to an external battery. The power management integrated circuit 130 can manage power requirements of the apparatus 100a (e.g., power requirements of the display an NFC processor, power requirements of the display controller 110, power requirements of the antenna controller 110, and power requirements of the pixel array display 104).

Figure 2:
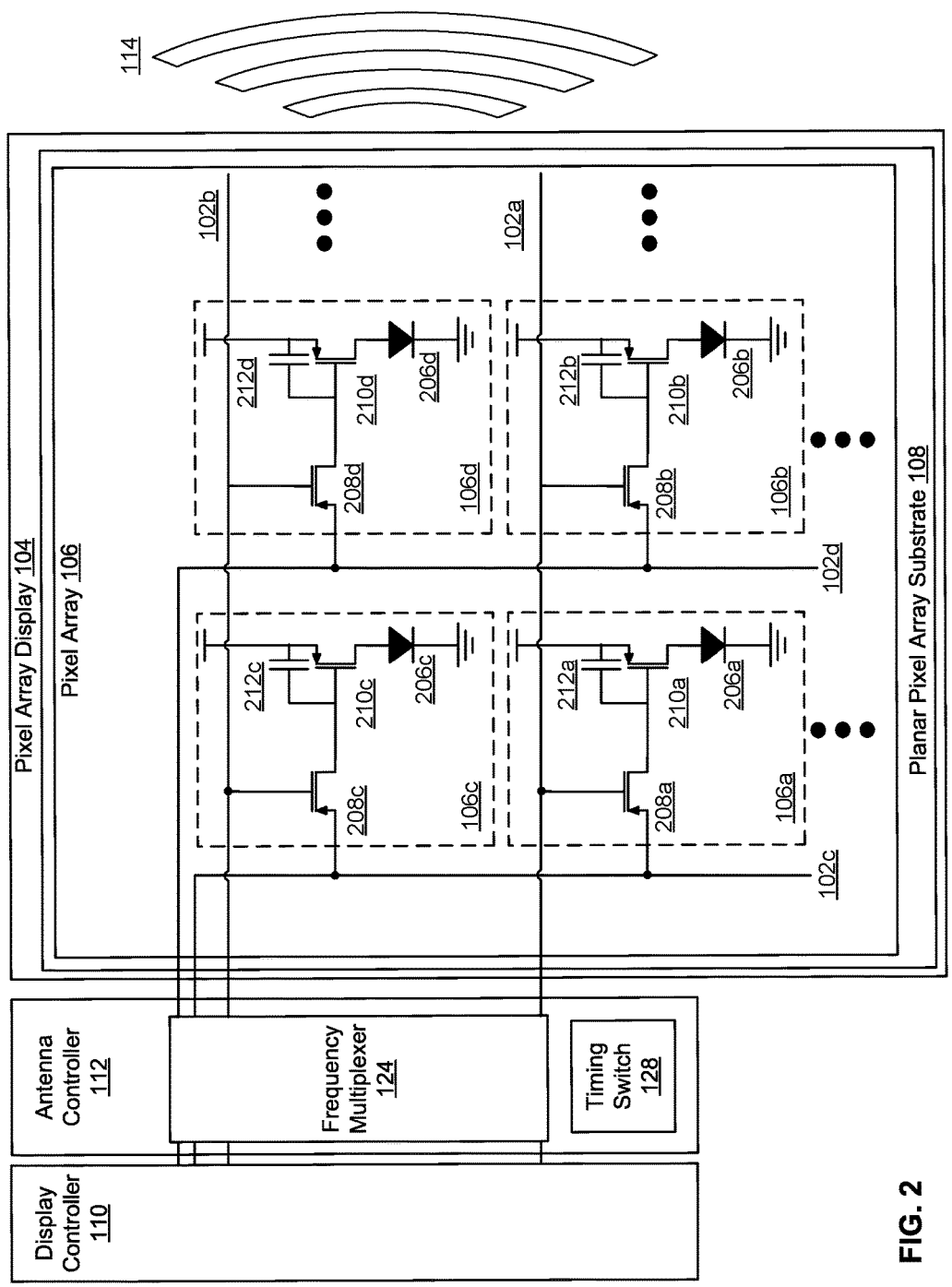
FIG. 2 is a diagram of an example implementation of the display 104 of the example system of FIG. 1.

FIG. 2 is a diagram of an example implementation of the display 104 of the example system of FIG. 1. In the example of FIG. 2, the array 104 is an example AMOLED (active-matrix organic light-emitting diode) display 104 (e.g., pixel array display 104) having its pixel activation line 102a integrated with the near field communication antenna. Like FIG. 1, FIG. 2 shows pixel activation line 102a, additional pixel activation line 102b, pixel array display 104, pixel array 106, first display pixel 106a, second display pixel 106b, first additional display pixel 106c, second additional display pixel 106d, (e.g., planar) pixel array substrate 108, display controller 110, antenna controller 112, and wireless communication signal 114. For a detailed description of operation of these elements in the example of FIG. 2, the reader is referred to the discussion of operation of these elements in the example of FIG. 1. Further, although for the sake of simplicity the wireless NFC device 116 and the display and NFC processor 118 of FIG. 1 are not shown in the simplified diagram of FIG. 2, the operation of these elements in the example of FIG. 2 is similar to what was already discussed with regard to these elements in the example of FIG. 1.

Further, although for the sake of simplicity in FIG. 1 only the pixel activation line 102a and the additional pixel activation line 102b were shown and discussed, additional lines are shown in the more detailed circuit diagram of FIG. 2. The pixel activation line 102a shown in FIG. 2 can be a pixel activation scan line 102a. Also shown in the example of FIG. 2 is a pixel activation data line 102c. Similarly, the additional pixel activation line 102b shown in FIG. 2 can be an additional pixel activation scan line 102b. Also shown in the example of FIG. 2 is an additional pixel activation data line 102d. The first display pixel 106a can be activated when the pixel activation line 102a carries the display activation signal (e.g., pixel activation scan line 102a) and when the pixel activation data line 102c also carries the display activation signal. Similarly, the second display pixel 106b can be activated when the pixel activation line 102a carries the display activation signal (e.g., pixel activation scan line 102a) and when the additional pixel activation data line 102d also carries the display activation signal. Moreover, the first additional display pixel 106c can be activated when the additional pixel activation line 102b carries the display activation signal (e.g., additional pixel activation scan line 102b) and when the pixel activation data line 102c also carries the display activation signal. Additionally, the second additional display pixel 106d can be activated when the additional pixel activation line 102b carries the display activation signal (e.g., additional pixel activation scan line 102b) and when the additional pixel activation data line 102d also carries the display activation signal.

As shown in the example of FIG. 2, a first AMOLED 206a is included in the first display pixel 106a. Similarly, a second AMOLED 206b is included in the second display pixel 106b. A first additional AMOLED 206c is included in the first additional display pixel 106c. A second additional AMOLED 206d is included in the second additional display pixel 106d. When the pixel activation line 102a carries the display activation signal from the display controller 110 (and when the pixel activation data line 102c also carries the display activation signal from the display controller 110) to activate visual display of the first display pixel 106a, the first AMOLED 206a is illuminated (e.g., emits visible light) for the visual display of the first display pixel 106a. Similarly, when the pixel activation line 102a carries the display activation signal from the display controller 110 (and when the additional pixel activation data line 102d also carries the display activation signal from the display controller 110) to activate visual display of the second display pixel 106b, the second AMOLED 206b is illuminated (e.g., emits visible light) for the visual display of the second display pixel 106b. When the additional pixel activation line 102b carries the display activation signal from the display controller 110 (and when the pixel activation data line 102c also carries the display activation signal from the display controller 110) to activate visual display of the first additional display pixel 106c, the first additional AMOLED 206c is illuminated (e.g., emits visible light) for the visual display of the first additional display pixel 106c. When the additional pixel activation line 102b carries the display activation signal from the display controller 110 (and when the additional pixel activation data line 102d also carries the display activation signal from the display controller 110) to activate visual display of the second additional display pixel 106d, the second additional AMOLED 206d is illuminated (e.g., emits visible light) for the visual display of the second additional display pixel 106d.

As shown in the example of FIG. 2, in addition to first AMOLED 206a, the first pixel 106a also includes a first switching transistor 208a, a first driving transistor 210a, and a first charge storage capacitor 212a. The first switching transistor 208a is controlled by the display activation signal from the pixel activation line 102a (e.g., pixel activation scan line 102a). The pixel activation line 102a (e.g., pixel activation scan line 102a) activates the first display pixel 106a by passing the display activation signal from the pixel activation data line 102c through the channel of the first switching transistor 208a to the gate of the first driving transistor 210a. The first driving transistor 210a activates the first AMOLED 206a by driving current through the first AMOLED 206a. The first charge storage capacitor 212a stores voltage of the pixel activation data line 102c.

As shown in the example of FIG. 2, in addition to the second AMOLED 206b, the second display pixel 106b also includes a second switching transistor 208b, a second driving transistor 210b, and a second charge storage capacitor 212b. These components of the second display pixel 106b operate similarly to corresponding components of the first display pixel 106a as just discussed, however these components of the second display pixel 106b are activated by the additional pixel activation data line 102d in combination with the pixel activation line 102a (e.g., pixel activation scan line 102a).

As shown in the example of FIG. 2, in addition to the first additional AMOLED 206c, the first additional display pixel 106c also includes a first additional switching transistor 208c, a first additional driving transistor 210c, and a first additional charge storage capacitor 212c. These components of the first additional display pixel 106c operate similarly to corresponding components of the first display pixel 106a as discussed previously, however these components of the first additional display pixel 106c are activated by the pixel activation data line 102c in combination with the additional pixel activation line 102b (e.g., additional pixel activation scan line 102b).

As shown in the example of FIG. 2, in addition to the second additional AMOLED 206d, the second additional display pixel 106d also includes a second additional switching transistor 208d, a second additional driving transistor 210d, and a second additional charge storage capacitor 212d. These components of the second additional display pixel 106d operate similarly to corresponding components of the first display pixel 106a as discussed previously, however these components of the second additional display pixel 106d are activated by the additional pixel activation data line 102d in combination with the additional pixel activation line 102b (e.g., additional pixel activation scan line 102b).

Using the antenna controller 112 and/or the frequency multiplexer 124 and/or the timing switch 128 in a similar manner as already discussed previously herein with respect to the example of FIG. 1, the pixel activation line 102a (e.g., pixel activation scan line 102a) shown in the example of FIG. 2 can also act as the integrated NFC antenna in a wireless transmitter mode to transmit the wireless communication signal 114 through the pixel activation line 102a. Similarly, the pixel activation line 102a (e.g., pixel activation scan line 102a) shown in the example of FIG. 2 can also operate as the integrated NFC antenna in a wireless receiver mode to receive the wireless communication signal 114 through the pixel activation line 102a. Alternatively or additionally, in other examples the pixel activation data line 102c can act as the integrated NFC antenna to carry the wireless communication signal 114. Alternatively or additionally, in other examples the additional pixel activation data line 102d can act as the integrated NFC antenna to carry the wireless communication signal 114. The pixel activation line 102a and/or the additional pixel activation line 102b and/or the pixel activation data line 102c and/or the additional pixel activation data line 102d can be metal lines. The pixel activation line 102a and/or the additional pixel activation line 102b and/or the pixel activation data line 102c and/or the additional pixel activation data line 102d can act as additional NFC antennas. The pixel activation line 102a and/or the additional pixel activation line 102b and/or the pixel activation data line 102c and/or the additional pixel activation data line 102d can cooperate to implement one or more NFC antennas. The pixel activation line 102a and/or the additional pixel activation line 102b and/or the pixel activation data line 102c and/or the additional pixel activation data line 102d can have a resistivity of less than one ohm per meter. The foregoing can facilitate transmission of the wireless communication signal 114 and/or additional signals over the pixel activation line 102a and/or the additional pixel activation line 102b and/or the pixel activation data line 102c and/or the additional pixel activation data line 102d at the same and/or different time(s).

Figure 3:
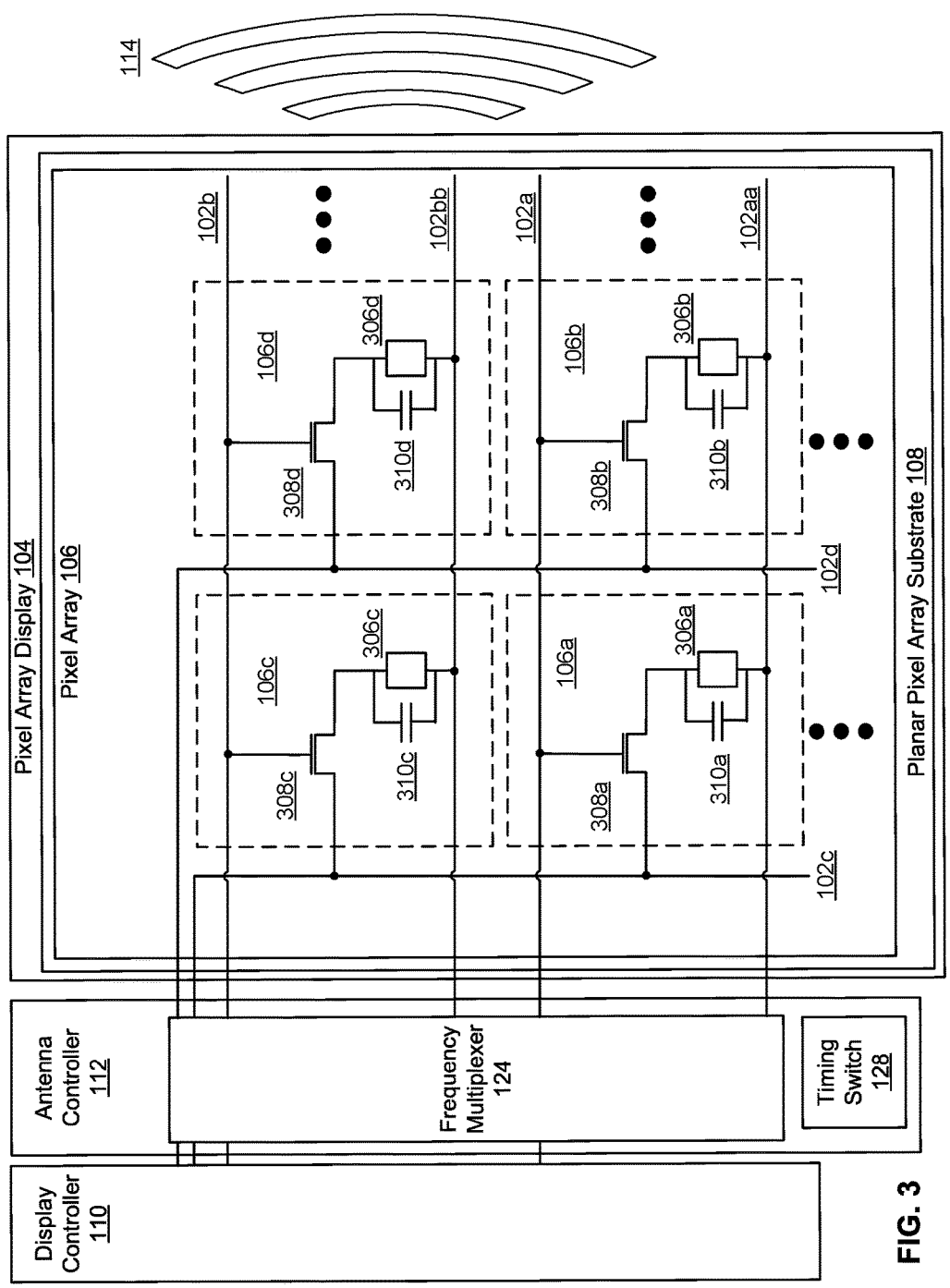
FIG. 3 a diagram of another example implementation of the display 104 of the example system of FIG. 1.

FIG. 3 a diagram of another example implementation of the display 104 of the example system of FIG. 1. In the example of FIG. 3, the array 104 is an example LCD (liquid crystal display) 104 (e.g. pixel array display 104) having its display pixel activation line integrated with the near field communication antenna. Like FIG. 1, FIG. 3 shows pixel activation line 102a, additional pixel activation line 102b, pixel array display 104, pixel array 106, first display pixel 106a, second display pixel 106b, first additional display pixel 106c, second additional display pixel 106d, (e.g., planar) pixel array substrate 108, display controller 110, antenna controller 112, and wireless communication signal 114. For a detailed description of operation of these elements in the example of FIG. 3, the reader is referred to the discussion of operation of these elements in the example of FIG. 1. Further, although for the sake of simplicity the wireless NFC device 116 of FIG. 1 and the display and NFC processor 118 of FIG. 1 are not shown in the simplified diagram of FIG. 3, the operation of these elements in the example of FIG. 3 is similar to what was already discussed with regard to these elements in the example of FIG. 1.

Further, although for the sake of simplicity in FIG. 1 only the pixel activation line 102a and the additional pixel activation line 102b were shown and discussed, additional lines are shown in the more detailed circuit diagram of FIG. 3. The pixel activation line 102a shown in FIG. 3 can be a pixel activation scan line 102a. Also shown in the example of FIG. 3 is a pixel activation voltage common ("VCOM") line 102aa. Also shown in the example of FIG. 3 is a pixel activation data line 102c. Similarly, the additional pixel activation line 102b shown in FIG. 3 can be an additional pixel activation scan line 102b. Also shown in the example of FIG. 3 is an additional pixel activation voltage common ("VCOM") line 102bb. Also shown in the example of FIG. 3 is an additional pixel activation data line 102d.

In the following discussions, it will be assumed that the appropriate common voltage is present on the pixel activation voltage common ("VCOM") line 102aa, and that the appropriate common voltage is present on the additional pixel activation voltage common ("VCOM") line 102bb. The first display pixel 106a shown in the example of FIG. 3 can be activated when the pixel activation line 102a carries the display activation signal (e.g., pixel activation scan line 102a) and when the pixel activation data line 102c also carries the display activation signal. Similarly, the second display pixel 106b can be activated when the pixel activation line 102a carries the display activation signal (e.g., pixel activation scan line 102a) and when the additional pixel activation data line 102d also carries the display activation signal. Moreover, the first additional display pixel 106c can be activated when the additional pixel activation line 102b carries the display activation signal (e.g., additional pixel activation scan line 102b) and when the pixel activation data line 102c also carries the display activation signal. Additionally, the second additional display pixel 106d can be activated when the additional pixel activation line 102b carries the display activation signal (e.g., additional pixel activation scan line 102b) and when the additional pixel activation data line 102d also carries the display activation signal.

As shown in the example of FIG. 3, a first LCD cell 306a is included in the first display pixel 106a. Similarly, a second LCD cell 306b is included in the second display pixel 106b. A first additional LCD cell 306c is included in the first additional display pixel 106c. A second additional LCD cell 306d is included in the second additional display pixel 106d. When the pixel activation line 102a carries the display activation signal from the display controller 110 (and when the pixel activation data line 102c also carries the display activation signal from the display controller 110) to activate visual display of the first display pixel 106a, the first LCD cell 306a is optically transmissive (e.g., transmits visible light) for the visual display of the first display pixel 106a. Similarly, when the pixel activation line 102a carries the display activation signal from the display controller 110 (and when the additional pixel activation data line 102d also carries the display activation signal from the display controller 110) to activate visual display of the second display pixel 106b, the second LCD cell 306b is optically transmissive (e.g., transmits visible light) for the visual display of the second display pixel 106b. When the additional pixel activation line 102b carries the display activation signal from the display controller 110 (and when the pixel activation data line 102c also carries the display activation signal from the display controller 110) to activate visual display of the first additional display pixel 106c, the first additional LCD cell 306c is optically transmissive (e.g., transmits visible light) for the visual display of the first additional display pixel 106c. When the additional pixel activation line 102b carries the display activation signal from the display controller 110 (and when the additional pixel activation data line 102d also carries the display activation signal from the display controller 110) to activate visual display of the second additional display pixel 106d, the second additional LCD cell 306d is optically transmissive (e.g., transmits visible light) for the visual display of the second additional display pixel 106d.

As shown in the example of FIG. 3, in addition to the first LCD cell 306a, the first pixel 106a also includes a first switching transistor 308a and a first charge storage capacitor 310a. The first switching transistor 308a is controlled by the display activation signal from the pixel activation line 102a (e.g., pixel activation scan line 102a). The pixel activation line 102a (e.g., pixel activation scan line 102a) activates the first display pixel 106a by passing the display activation signal from the pixel activation data line 114 through the channel of the first switching transistor 308a to the first LCD cell 306a. The first charge storage capacitor stores 212a stores the voltage of the pixel activation data line 102c.

As shown in the example of FIG. 3, in addition to the second LCD cell 306b, the second display pixel 106b also includes a second switching transistor 308b, and a second charge storage capacitor 310b. These components of the second display pixel 106b operate similarly to corresponding components of the first display pixel 106a as just discussed, however these components of the second display pixel 106b are activated by the additional pixel activation data line 102d in combination with the pixel activation line 102a (e.g., pixel activation scan line 102a).

As shown in the example of FIG. 3, in addition to the first additional LCD cell 306c, the first additional display pixel 106c also includes a first additional switching transistor 308c and a first additional charge storage capacitor 310c. These components of the first additional display pixel 106c operate similarly to corresponding components of the first display pixel 106a as discussed previously, however these components of the first additional display pixel 106c are activated by the pixel activation data line 102c in combination with the additional pixel activation line 102b (e.g., additional pixel activation scan line 102b).

As shown in the example of FIG. 3, in addition to the second additional LCD cell 306d, the second additional display pixel 106d also includes a second additional switching transistor 308d and a second additional charge storage capacitor 310d. These components of the second additional display pixel 106d operate similarly to corresponding components of the first display pixel 106a as discussed previously, however these components of the second additional display pixel 106d are activated by the additional pixel activation data line 102d in combination with the additional pixel activation line 102b (e.g., additional pixel activation scan line 102b).

Using the antenna controller 112 and/or the frequency multiplexer 124 and/or the timing switch 128 in a similar manner as already discussed previously herein with respect to the example of FIG. 1, the pixel activation line 102a (e.g., pixel activation scan line 102*a*) shown in the example of FIG. 3 can also act as the integrated NFC antenna in a wireless transmitter mode to transmit the wireless communication signal 114 through the pixel activation line 102*a*. Similarly, the pixel activation line 102*a* (e.g., pixel activation scan line 102*a*) shown in the example of FIG. 3 can also act as the integrated NFC antenna in a wireless receiver mode to receive the wireless communication signal 114 through pixel activation line 102*a*. Alternatively or additionally, in other examples the pixel activation VCOMM line 102*aa* can act as the integrated NFC antenna to carry the wireless communication signal 114. Alternatively or additionally, in other examples the additional pixel activation VCOMM line 102*bb* can act as the integrated NFC antenna to carry the wireless communication signal 114 and/or other signal(s). Alternatively or additionally, in other examples the pixel activation data line 102*c* can act as the integrated NFC antenna to carry the wireless communication signal 114. Alternatively or additionally, in other examples the additional pixel activation data line 102*d* can act as the integrated NFC antenna to carry the wireless communication signal 114. The pixel activation line 102*a* and/or the additional pixel activation line 102*b* and/or the pixel activation VCOMM line 102*aa* and/or the additional pixel activation VCOMM line 102*bb* and/or the pixel activation data line 102*c* and/or the additional pixel activation data line 102*d* can be transparent conductor lines (e.g., indium tin oxide lines). The foregoing can facilitate light transmission through the LCD cells 306*a*, 306*b*, 306*c*, 306*d*.

Figure 4:
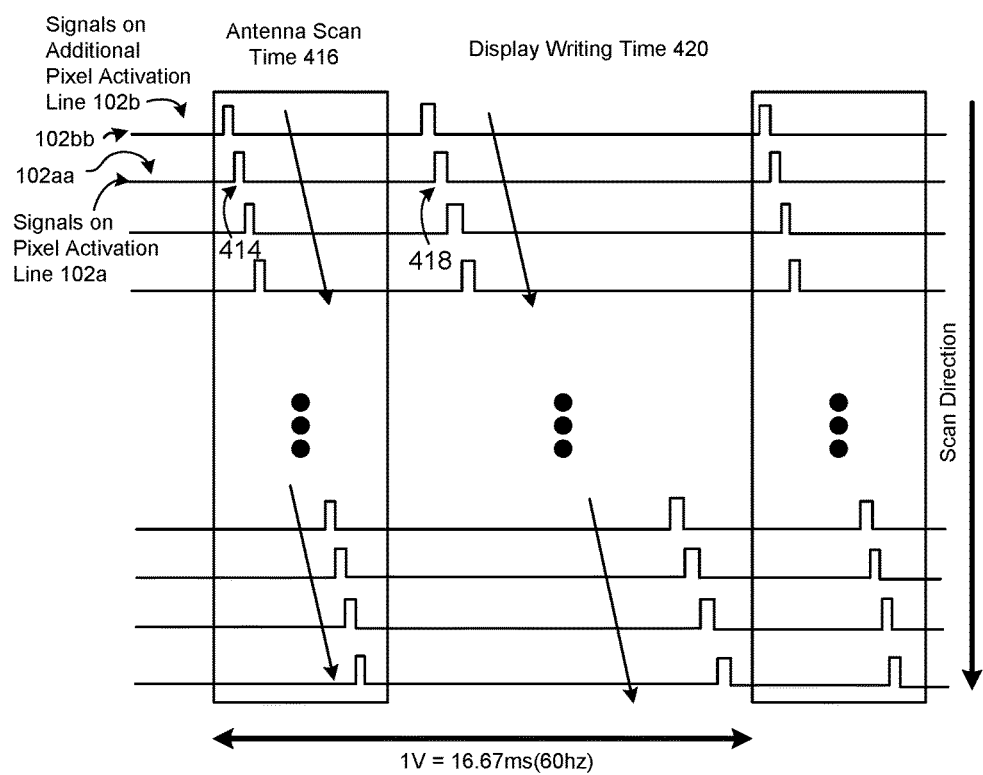
FIG. 4 is a timing diagram illustrating timing of the near field communication signal and the display activation signal on the display pixel activation line.

FIG. 4 is a timing diagram illustrating timing of the near field communication signal 414 and the display activation signal 418 on the display pixel activation line 102*a*. The wireless communication signal 414 carried by the display pixel activation line during the antenna scan time 416 can include a radio frequency (RF) burst having a carrier frequency of 13.56 megahertz (e.g., near field communication signal 414). In contrast, the display activation signal 418 carried by the display pixel activation line during a display writing time 420 can have a display activation signal frequency (e.g., a video band frequency of the display activation signal).

As illustrated in the example of FIG. 4 the wireless communication signal 414 and the display activation signal 418 can be multiplexed over the pixel activation line 102*a*. The display activation signal 418 can be transmitted over the pixel activation line 102*a* when the at least one of the first display pixel and the second display pixel is to be activated, (e.g., during the display writing time 420). Further, the wireless communication signal 414 can be transmitted on the pixel activation line 102*a* while the display activation signal 418 is not selected. For example, the wireless communication signal 414 can be transmitted on the pixel activation line 102*a* during the antenna scan time 416 while the display activation signal 418 is not selected.

For example, as shown in the example of FIG. 4, the pixel activation line 102*a* can be used in a first time period (e.g. display writing time 420) to activate the pixel (e.g. activate the first pixel). Further, the pixel activation line 102*a* can be used in a second time period (e.g., antenna scan time 416) to transmit the wireless communication signal 414 (e.g., NFC signal 414). In the example of FIG. 4, the first time period does not overlap the second time period (e.g., display writing time 420 does not overlap the antenna scan time 416). For example, the pixel activation line 102*a* can be coupled between the display controller and the display pixel, and the pixel activation line 102*a* can be activated to activate visual display of the display pixel at the first time (e.g., display writing time 420). Further, the antenna controller can be coupled with the pixel activation line 102*a* to couple the wireless communication signal 414 through the pixel activation line 102*a* at the second time (e.g., antenna scan time 416). In the example of FIG. 4, the second time is different from the first time (e.g., the antenna scan time 416 is different than the display writing time 420).

Alternatively, or additionally, the wireless communication signal and the display activation signal can be multiplexed over the additional pixel activation line 102*b*. The display activation signal can be transmitted over the additional pixel activation line 102*b* when the at least one of the first additional display pixel and the second additional display pixel is to be activated, (e.g., during the display writing time 420). Further, the wireless communication signal can be transmitted on the additional pixel activation line 102*b* while the display activation signal is not selected. For example, the wireless communication signal can be transmitted on the additional pixel activation line 102*b* during the antenna scan time 416 while the display activation signal 418 is not selected.

Moreover, FIG. 4 shows how a full display frame can be written to the pixel array display using the pixel activation signals (e.g., pixel activation signal 418) carried over the pixel activation lines (e.g., pixel activation line 102*a*, additional pixel activation line 102*b*, etc.,) during the display writing time 420. FIG. 4 also shows how the pixel activation lines (e.g., pixel activation line 102*a*, additional pixel activation line 102*b*, etc.,) can act as NFC antennas, using the wireless communication signals (e.g., wireless communication signal 414) carried over the pixel activation lines (e.g., pixel activation line 102*a*, additional pixel activation line 102*b*, etc.,) during the antenna scan time 416. For one full display frame, the display writing time 420 added with the antenna scan time 416 can, for example, sum to 16.67 milliseconds for 1V (e.g., one volt). Accordingly, the antenna scan time 416 can, for example, be a fraction of this 16.67 milliseconds for 1V (e.g., one volt).

Figure 5:
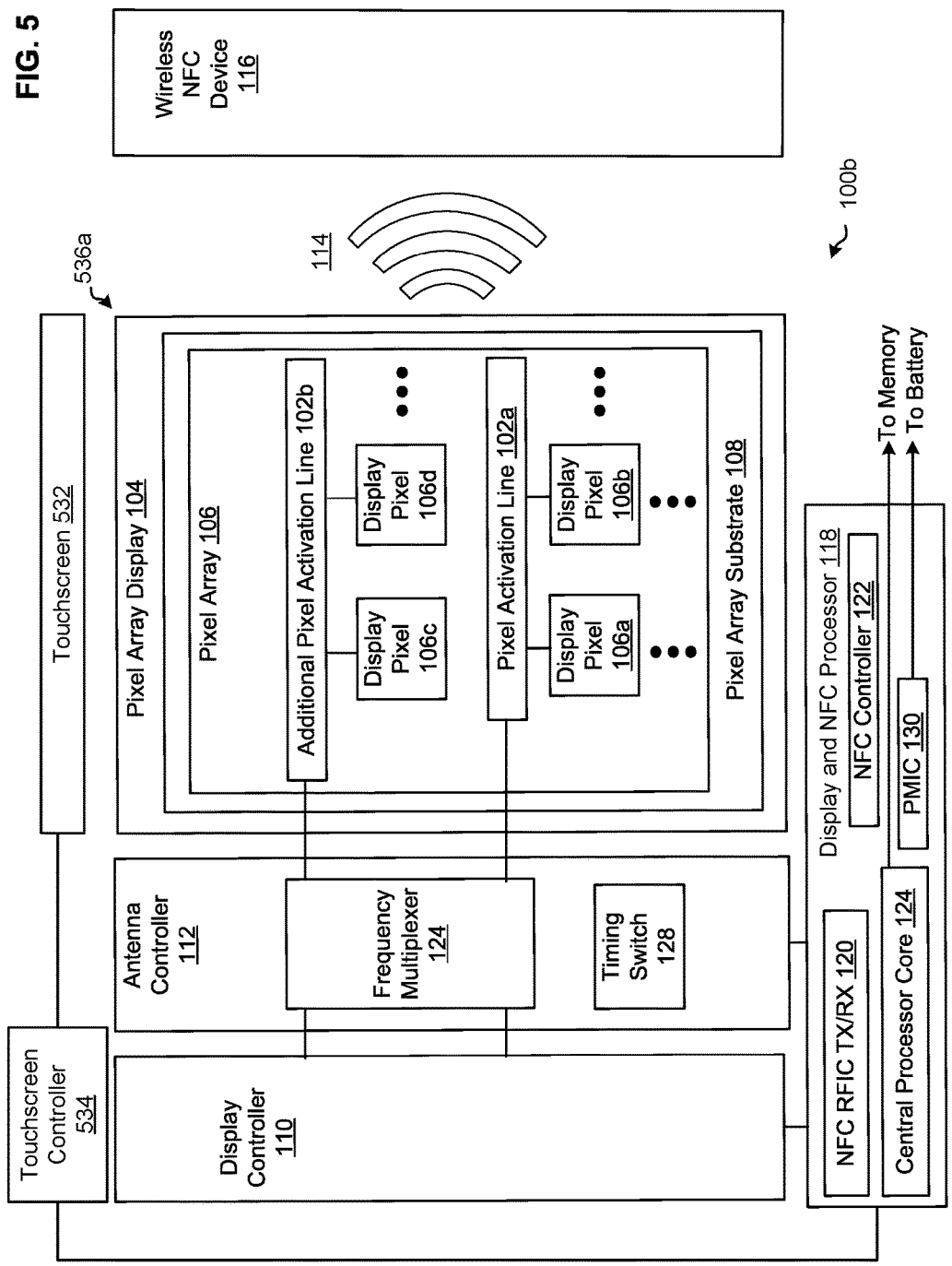
FIG. 5 is a block diagram of another example system that is similar to the example system of FIG. 1.

FIG. 5 is a block diagram of another example system that is similar to the example system of FIG. 1. Like FIG. 1, FIG. 5 shows pixel activation line 102*a*, additional pixel activation line 102*b*, pixel array display 104, pixel array 106, first display pixel 106*a*, second display pixel 106*b*, first additional display pixel 106*c*, second additional display pixel 106*d*, (e.g., planar) pixel array substrate 108, display controller 110, antenna controller 112, wireless communication signal 114, wireless NFC device 116, display and NFC processor 118 (as well as its associated components), frequency multiplexer 124 and timing switch 128. For a detailed description of operation of these elements in the example of FIG. 5, the reader is referred to the discussion of operation of these elements in the example of FIG. 1.

Further, in the example of FIG. 5, example apparatus 100*b* includes a touchscreen 532 (e.g. touch sensor 532) and a touch screen controller 534. The touchscreen controller 534 can be coupled between the touchscreen 532 and the display and NFC processor 118. The touchscreen 532 can be arranged over the pixel array display 104 (e.g., over the pixel array 106.)

Additionally, in example apparatus 100*b*, the near field communication antenna (e.g., NFC antenna) is integrated with the pixel activation line 102*a* of the pixel array display 104. The pixel array display 104 can include the pixel array 106 disposed on the pixel array substrate 108. The pixel array 106 can include the first display pixel 106*a* and the second display pixel 106*b*, as well as the first additional display pixel 106*c* and the second additional display pixel 106d. The first display pixel 106a and the second display pixel 106b, as well as a first additional display pixel 106c and a second additional display pixel 106d, can be disposed on the pixel array substrate 108. Accordingly, the elements shown in FIG. 5 as included in the pixel display can be arranged in a display stack 536a.

The display stack 536a shown in the example of FIG. 5 includes the NFC antenna. For example, the near field communication antenna (e.g., NFC antenna) is integrated with the pixel activation line 102a, and the pixel activation line 102a is the pixel activation line 102a to the first display pixel 106a. In the example of FIG. 5, the antenna controller 112 transmits the NFC signal 114 (e.g., wireless communication signal 114) through the NFC antenna (e.g. through pixel activation line 102a) of the display stack 536a. The touchscreen 532 can be arranged over the display stack 536a.

Figure 6:
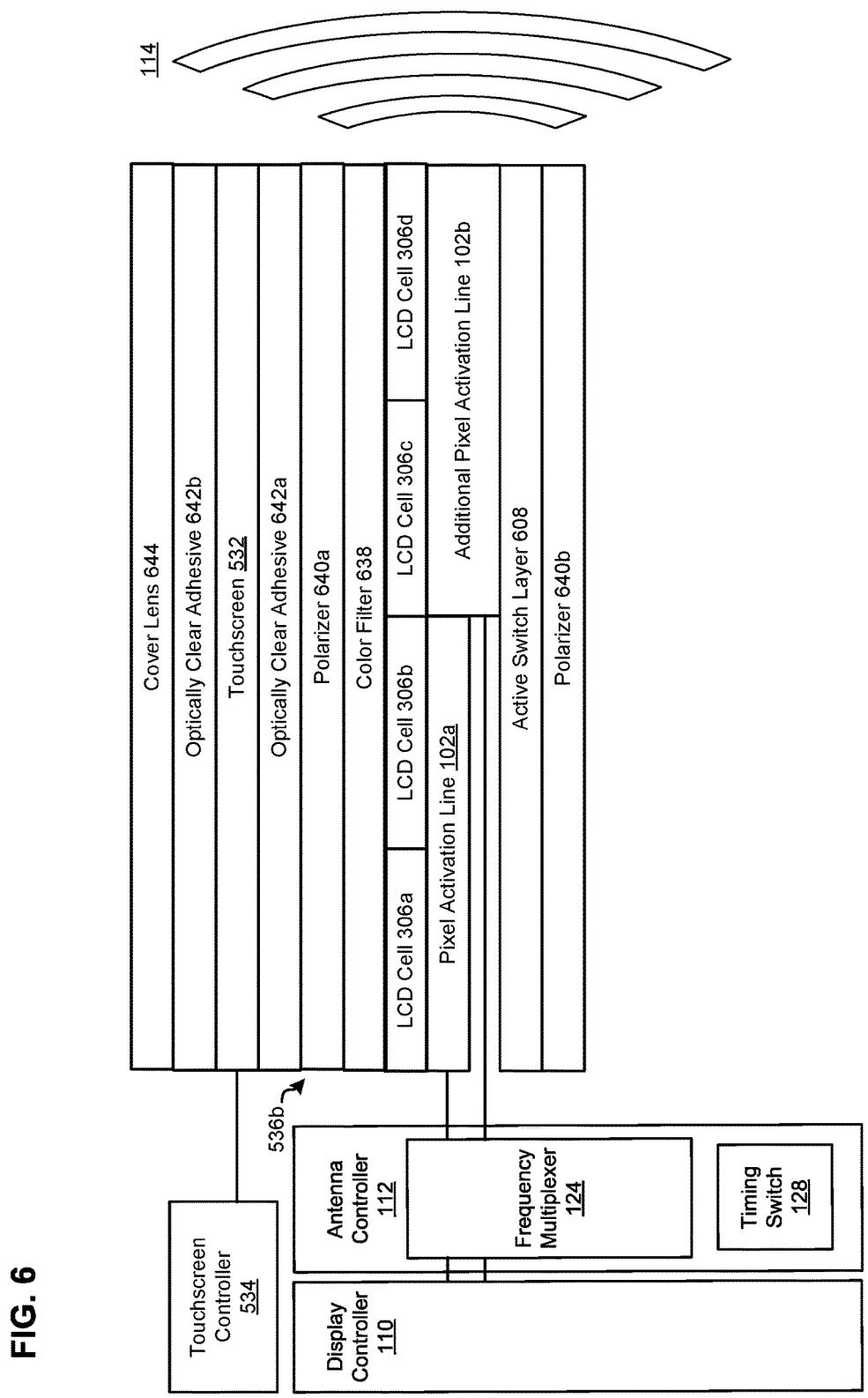
FIG. 6 is a block diagram of an example display stack including the touchscreen 532 shown in FIG. 5.

FIG. 6 is a block diagram of an example display stack including the touchscreen 532 shown in FIG. 5. Like FIG. 5, the example of FIG. 6 also shows touchscreen controller 534. Like FIG. 1, FIG. 3 and FIG. 5, the example of FIG. 6 shows pixel activation line 102a, additional pixel activation line 102b, display controller 110, antenna controller 112, wireless communication signal 114, frequency multiplexer 124 and timing switch 128. For a detailed description of operation of these elements in the example of FIG. 6, the reader is referred to the discussion of operation of these elements in the examples in the prior figures.

In the example of FIG. 6, example display stack 536b can include first LCD cell 306a and second LCD cell 306b to be activated by pixel activation line 102a, and can also include first additional LCD cell 306c, and second additional LCD cell 306d to be activated by additional pixel activation line 102b. The operation of the foregoing is already discussed in detail previously herein relative to the example of FIG. 3. For example, the switching transistors discussed in detail previously herein relative to the LCD example of FIG. 3 can be included in an example active switch layer 608 of the example display stack 536b shown in the example of FIG. 6. Further, the example display stack 536b can include a color filter 638. The foregoing portions of example display stack 536b can be sandwiched between a first polarizer 640a and a second polarizer 640b of display stack 536b.

As shown in the example of FIG. 6, a first layer of optically clear adhesive 642a and be used to adhere the touchscreen 532 to the display stack 536b (e.g., adhere the touchscreen 532 to the first polarizer 640a of display stack 536b.) The touchscreen 532 can be sandwiched between a cover lens 644 and the display stack 536b using the first layer of optically clear adhesive 642a and a second layer of optically clear adhesive 642b.

The display stack 536b shown in the example of FIG. 6 includes the NFC antenna. For example, the near field communication antenna (e.g., NFC antenna) is integrated with the pixel activation line 102a. In the example of FIG. 6, the antenna controller 112 transmits the NFC signal 114 (e.g., wireless communication signal 114) through the NFC antenna (e.g. through pixel activation line 102a). Alternatively or additionally, the near field communication antenna (e.g., NFC antenna) is integrated with the additional pixel activation line 102b. In the example of FIG. 6, the antenna controller 112 can transmit the NFC signal 114 (e.g., wireless communication signal 114) through the NFC antenna (e.g. through additional pixel activation line 102b).

While example manners of implementing the example systems illustrated in FIGS. 1-6, one or more of the elements, processes and/or devices illustrated in FIGS. 1-6 may be combined, divided, re-arranged, omitted, eliminated and/or implemented in any other way. For example, the example apparatus 100a, 100b, example pixel activation line 102a, example additional pixel activation line 102b, example pixel activation data line 102c, example additional pixel activation data line 102d, example pixel array display 104, example pixel array 106, example first display pixel 106a, example second display pixel 106b, example first additional display pixel 106c, example second additional display pixel 106d, example pixel array substrate 108, example display controller 110, example antenna controller 112, example wireless communication signal 114, 414, example wireless NFC device 116, example display and NFC processor 118, example NFC RF integrated circuit (IC) transmitter and receiver (TX/RX) 120, example NFC controller 122, example frequency multiplexer 124, example central core processor 126, example timing switch 128, example power management integrated circuit 130, example first AMOLED 206a, example second AMOLED 206b, example first additional AMOLED 206c, example second additional AMOLED 206d, example first switching transistor 208a, example second switching transistor 208b, example first additional switching transistor 208c, example second additional switching transistor 208d, example first driving transistor 210a, example second driving transistor 210b, example first additional driving transistor 210c, example second additional driving transistor 210d, example first charge storage capacitor 212a, example second charge storage capacitor 212b, example first additional charge storage capacitor 212c, example second additional charge storage capacitor 212d, example first LCD cell 306a, second LCD cell 306b, first additional LCD cell 306c, second additional LCD cell 306d, example first switching transistor 308a, example second switching transistor 308b, example first additional switching transistor 308c, example second additional switching transistor 308d, example first charge storage capacitor 310a, example second charge storage capacitor 310b, example first additional charge storage capacitor 310c, example second additional charge storage capacitor 310d, example antenna scan time 416, example display activation signal 418, example display writing time 420, example touchscreen 532, example touchscreen controller 534, example display stack 536a, 536b, example active switch layer 608, example color filter 638, example first polarizer 640a, example second polarizer 640b, example first layer of optically clear adhesive 642a, example second layer of optically clear adhesive 642b, and example cover lens 644 may be combined, divided, re-arranged, omitted, eliminated and/or implemented in any other way.

Further the example systems illustrated in FIGS. 1-6, example apparatus 100a, 100b, example pixel activation line 102a, example additional pixel activation line 102b, example pixel activation data line 102c, example additional pixel activation data line 102d, example pixel array display 104, example pixel array 106, example first display pixel 106a, example second display pixel 106b, example first additional display pixel 106c, example second additional display pixel 106d, example pixel array substrate 108, example display controller 110, example antenna controller 112, example wireless communication signal 114, 414, example wireless NFC device 116, example display and NFC processor 118, example NFC RF integrated circuit (IC) transmitter and receiver (TX/RX) 120, example NFC controller 122, example frequency multiplexer 124, example central core processor 126, example timing switch 128, example power management integrated circuit 130, example first AMOLED 206a, example second AMOLED 206b, example first additional AMOLED 206c, example second additional AMOLED 206d, example first switching transistor 208a, example second switching transistor 208b, example first additional switching transistor 208c, example second additional switching transistor 208ad, example first driving transistor 210a, example second driving transistor 210b, example first additional driving transistor 210c, example second additional driving transistor 210d, example first charge storage capacitor 212a, example second charge storage capacitor 212b, example first additional charge storage capacitor 212c, example second additional charge storage capacitor 212d, example first LCD cell 306a, second LCD cell 306b, first additional LCD cell 306c, second additional LCD cell 306d, example first switching transistor 308a, example second switching transistor 308b, example first additional switching transistor 308c, example second additional switching transistor 308d, example first charge storage capacitor 310a, example second charge storage capacitor 310b, example first additional charge storage capacitor 310c, example second additional charge storage capacitor 310d, example antenna scan time 416, example display activation signal 418, example display writing time 420, example touchscreen 532, example touchscreen controller 534, example display stack 536a, 536b, example active switch layer 608, example color filter 638, example first polarizer 640a, example second polarizer 640b, example first layer of optically clear adhesive 642a, example second layer of optically clear adhesive 642b, and example cover lens 644 may include more than one of any or all of the illustrated elements, processes and devices.

The example systems illustrated in FIGS. 1-6, example apparatus 100a, 100b, example pixel activation line 102a, example additional pixel activation line 102b, example pixel activation data line 102c, example additional pixel activation data line 102d, example pixel array display 104, example pixel array 106, example first display pixel 106a, example second display pixel 106b, example first additional display pixel 106c, example second additional display pixel 106d, example pixel array substrate 108, example display controller 110, example antenna controller 112, example wireless communication signal 114, 414, example wireless NFC device 116, example display and NFC processor 118, example NFC RF integrated circuit (IC) transmitter and receiver (TX/RX) 120, example NFC controller 122, example frequency multiplexer 124, example central core processor 126, example timing switch 128, example power management integrated circuit 130, example first AMOLED 206a, example second AMOLED 206b, example first additional AMOLED 206c, example second additional AMOLED 206d, example first switching transistor 208a, example second switching transistor 208b, example first additional switching transistor 208c, example second additional switching transistor 208ad, example first driving transistor 210a, example second driving transistor 210b, example first additional driving transistor 210c, example second additional driving transistor 210d, example first charge storage capacitor 212a, example second charge storage capacitor 212b, example first additional charge storage capacitor 212c, example second additional charge storage capacitor 212d, example first LCD cell 306a, second LCD cell 306b, first additional LCD cell 306c, second additional LCD cell 306d, example first switching transistor 308a, example second switching transistor 308b, example first additional switching transistor 308c, example second additional switching transistor 308d, example first charge storage capacitor 310a, example second charge storage capacitor 310b, example first additional charge storage capacitor 310c, example second additional charge storage capacitor 310d, example display activation signal 418, example touchscreen 532, example touchscreen controller 534, example display stack 536a, 536b, example active switch layer 608, example color filter 638, example first polarizer 640a, example second polarizer 640b, example first layer of optically clear adhesive 642a, example second layer of optically clear adhesive 642b, and example cover lens 644 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example pixel activation line 102a, example additional pixel activation line 102b, example pixel activation data line 102c, example additional pixel activation data line 102d, example pixel array display 104, example pixel array 106, example first display pixel 106a, example second display pixel 106b, example first additional display pixel 106c, example second additional display pixel 106d, example pixel array substrate 108, example display controller 110, example antenna controller 112, example wireless communication signal 114, 414, example wireless NFC device 116, example display and NFC processor 118, example NFC RF integrated circuit (IC) transmitter and receiver (TX/RX) 120, example NFC controller 122, example frequency multiplexer 124, example central core processor 126, example timing switch 128, example power management integrated circuit 130, example first AMOLED 206a, example second AMOLED 206b, example first additional AMOLED 206c, example second additional AMOLED 206d, example first switching transistor 208a, example second switching transistor 208b, example first additional switching transistor 208c, example second additional switching transistor 208ad, example first driving transistor 210a, example second driving transistor 210b, example first additional driving transistor 210c, example second additional driving transistor 210d, example first charge storage capacitor 212a, example second charge storage capacitor 212b, example first additional charge storage capacitor 212c, example second additional charge storage capacitor 212d, example first LCD cell 306a, second LCD cell 306b, first additional LCD cell 306c, second additional LCD cell 306d, example first switching transistor 308a, example second switching transistor 308b, example first additional switching transistor 308c, example second additional switching transistor 308d, example first charge storage capacitor 310a, example second charge storage capacitor 310b, example first additional charge storage capacitor 310c, example second additional charge storage capacitor 310d, example display activation signal 418, example touchscreen 532, example touchscreen controller 534, example display stack 536a, 536b, example active switch layer 608, example color filter 638, example first polarizer 640a, example second polarizer 640b, example first layer of optically clear adhesive 642a, example second layer of optically clear adhesive 642b, and example cover lens 644 is/are hereby expressly defined to include a non-transitory computer readable storage device or storage disk such as a memory, a digital versatile disk (DVD), a compact disk (CD), a Blu-ray disk, etc. storing the software and/or firmware.

Figure 7:
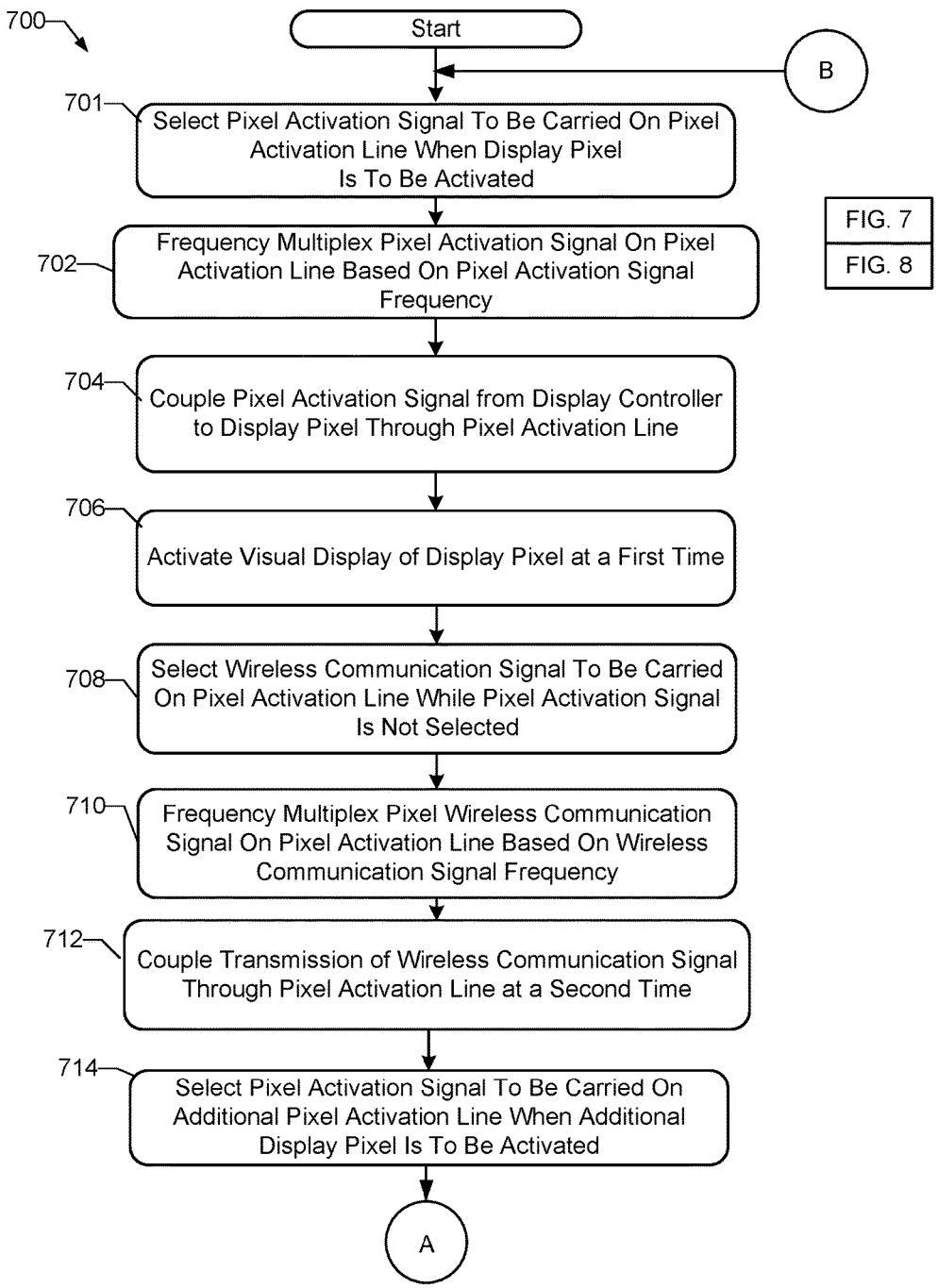
FIGS. 7-8 show an example flowchart of an example process of this disclosure.
Figure 8:
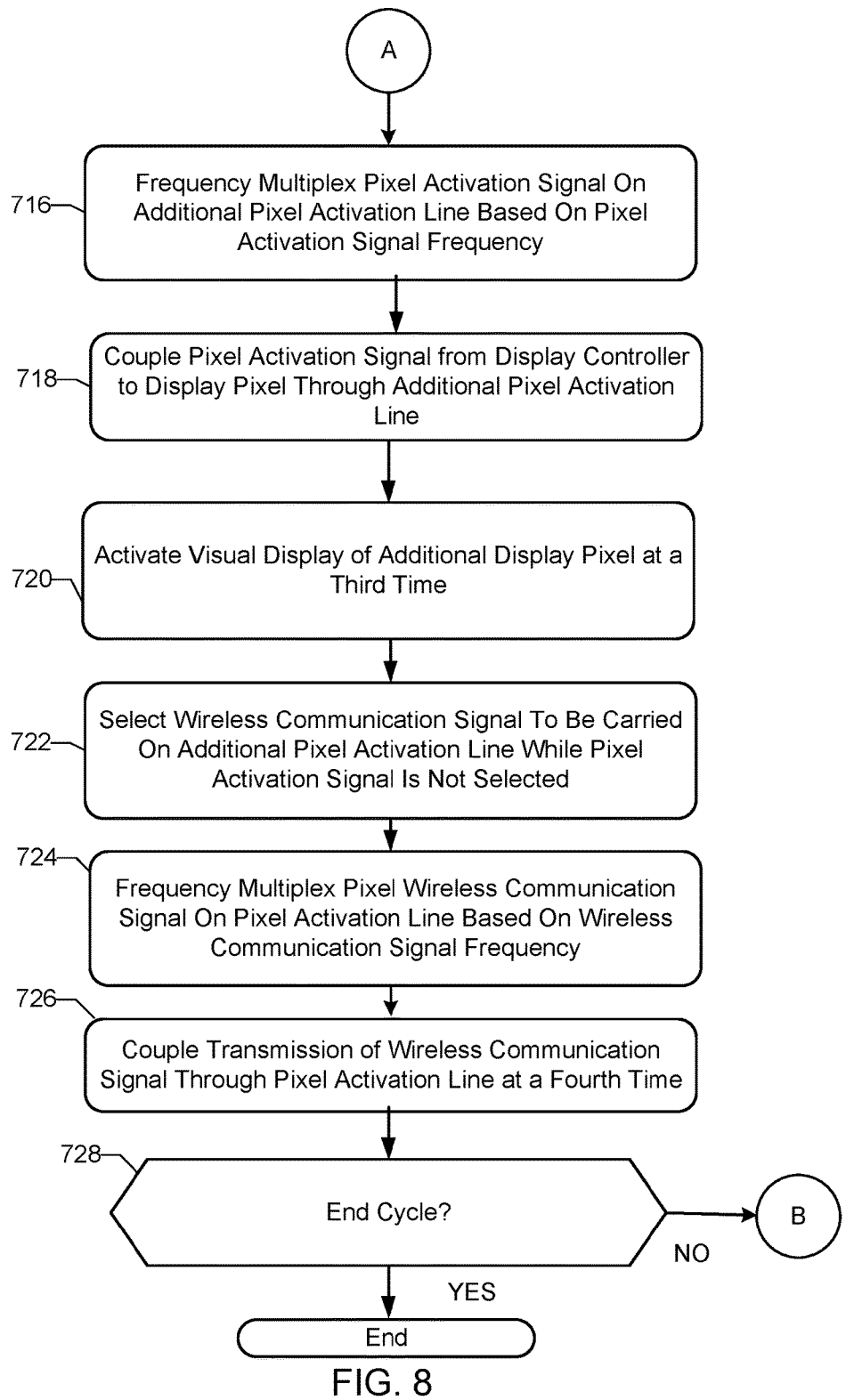

FIGS. 7-8 are an example flowchart of an example process 700 of this disclosure. The flowchart may be representative of machine readable instructions that may be executed to implement the example elements, processes and/or devices illustrated in FIGS. 1-6. In these examples, the machine readable instructions implement programs for execution by a processor such as the processor 912 shown in the example processor platform 900 discussed below in connection with FIG. 9. The programs may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowchart illustrated in FIGS. 7-6, other methods in accordance with the teachings of this disclosure may alternatively be used. For example, the order of execution of the blocks may be changed, and/or some of the blocks described may be changed, eliminated, or combined.

As mentioned above, the example processes of FIGS. 7-8 may be implemented using coded instructions (e.g., computer and/or machine readable instructions) stored on a non-transitory computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer readable storage medium is expressly defined to include any type of computer readable storage device and/or storage disk and to exclude propagating signals and to exclude transmission media. As used herein, "non-transitory computer readable storage medium" and "non-transitory machine readable storage medium" are used interchangeably.

The method 700 of FIGS. 7-8 begins at block 701. At block 701 of the example of FIG. 7, when the display pixel is to be activated, for example, by the display controller, the timing switch can select the pixel activation signal to be carried on the pixel activation line. For example, the timing switch 128 shown in the example of FIG. 1 can be switched by the antenna controller 112 in cooperation with the display controller 110 to select the display activation signal when the display pixel is to be activated. For example, the timing switch 128 can be switched in a first switching state that can conduct the pixel activation signal from the display controller 110 and to be carried through the pixel activation line 102a. Further, the first switching state of the timing switch 128 can facilitate isolation of the pixel activation line 102a from the NFC RF integrated circuit (IC) transmitter and receiver (TX/RX) 120, and from the near field communication processor 122. The first switching state of the timing switch 128 can facilitate isolation of the pixel activation signal from the NFC RF integrated circuit (IC) transmitter and receiver (TX/RX) 120, and from the near field communication processor 122.

Next, as shown in the example of FIG. 7, at block 702 the display activation signal can be multiplexed over the pixel activation line based on a display activation signal frequency. For example, the frequency multiplexer 124 as shown in the example of FIG. 1 can frequency multiplex the display activation signal over the pixel activation line 102a based on the display activation signal frequency. Further, the frequency multiplexer 124 can facilitate isolating the pixel activation signal from the NFC RF integrated circuit (IC) transmitter and receiver (TX/RX) 120, and from the near field communication processor 122, based on the display activation signal frequency.

Next, as shown in the example of FIG. 7, at block 704 the pixel activation signal can be coupled from the display controller to the display pixel through the pixel activation line. For example, as shown in the example of FIG. 1, the pixel activation signal can be coupled from the display controller 110 and through the pixel activation line 102a and to the display pixel to be activated (e.g. to the first display pixel 106a.)

Next, as shown in the example of FIG. 7, at block 706 visual display of the display pixel can be activated at a first time. For example, in the example of FIG. 1, the pixel activation line 102a coupled between the display controller 110 and the display pixel (e.g., first display pixel 106a) can be activated via the pixel activation signal to activate visual display of the display pixel (e.g., display of first display pixel 106a) at the first time.

Next, as shown in the example of FIG. 7, at block 708, while the pixel activation signal is not selected, the wireless communication signal can be selected to be carried on the pixel activation line. For example, the timing switch 128 shown in the example of FIG. 1 can be switched to select the wireless communication 114 to be carried on the pixel activation line 102a, while the pixel activation signal is not selected to be carried on the pixel activation line 102a. For example, the timing switch 128 can be switched in a second switching state that can conduct the wireless communication signal 114 to be carried through the pixel activation line 102a. Further, the second switching state of the timing switch 128 can facilitate isolation of the display controller 110 from the wireless communication signal 114. The second switching state of the timing switch 128 can facilitate the pixel activation signal not being selected to be carried on the pixel activation line 102a, while the wireless communication signal 114 is selected to be carried through the pixel activation line 102a.

Next, as shown in the example of FIG. 7, at block 710 the wireless communication signal can be multiplexed over the pixel activation line based on a wireless communication signal frequency. For example, the frequency multiplexer 124 as shown in the example of FIG. 1 can frequency multiplex the wireless communication signal 114 over the pixel activation line 102a based on the wireless communication signal frequency. Further, the frequency multiplexer 124 can facilitate isolating the wireless communication signal 114 from the display controller 110, based on the wireless communication signal frequency.

Next, as shown in the example of FIG. 7, at block 712 the wireless communication signal can be coupled through the pixel activation line at a second time that is different than the first time. For example, as shown in the example of FIG. 1, the wireless communication signal 114 can be coupled from the NFC RF integrated circuit (IC) transmitter and receiver (TX/RX) 120 and through the pixel activation line 102a at the second time.

At block 714 of the example of FIG. 7, when an additional display pixel is to be activated, the pixel activation signal can be selected to be carried on an additional pixel activation line. For example, the timing switch 128 shown in the example of FIG. 1 can be switched to select the display activation signal when the additional display pixel is to be activated. For example, the timing switch 128 can be switched in a third switching state that can conduct the pixel activation signal from the display controller 110 and to be carried through the additional pixel activation line 102b.

Further, the third switching state of the timing switch 128 can facilitate isolation of the additional pixel activation line 102b from the NFC RF integrated circuit (IC) transmitter and receiver (TX/RX) 120, and from the near field communication processor 122. The third switching state of the timing switch 128 can facilitate isolation of the pixel activation signal from the NFC RF integrated circuit (IC) transmitter and receiver (TX/RX) 120, and from the near field communication processor 122.

Next, as shown in the example of FIG. 8, at block 716 the display activation signal can be multiplexed over the additional pixel activation line based on the display activation signal frequency. For example, the frequency multiplexer 124 as shown in the example of FIG. 1 can frequency multiplex the display activation signal over the additional pixel activation line 102b based on the display activation signal frequency. Further, the frequency multiplexer 124 can facilitate isolating the pixel activation signal from the NFC RF integrated circuit (IC) transmitter and receiver (TX/RX) 120, and from the near field communication processor 122, based on the display activation signal frequency.

Next, as shown in the example of FIG. 8, at block 718 the pixel activation signal can be coupled from the display controller to the additional display pixel through the additional pixel activation line. For example, as shown in the example of FIG. 1, the pixel activation signal can be coupled from the display controller 110 and through the additional pixel activation line 102b and to the display pixel to be activated (e.g. to the first additional display pixel 106c.)

Next, as shown in the example of FIG. 8, at block 720 visual display of the additional display pixel can be activated at a third time. For example, in the example of FIG. 1, the additional pixel activation line 102b coupled between the display controller 110 and the additional display pixel (e.g., first additional display pixel 106c) can be activated via the pixel activation signal to activate visual display of the additional display pixel (e.g., display of first additional display pixel 106c) at the first time.

Next, as shown in the example of FIG. 8, at block 722, while the pixel activation signal is not selected, the wireless communication signal can be selected to be carried on the additional pixel activation line. For example, the timing switch 128 shown in the example of FIG. 1 can be switched to select the wireless communication 114 to be carried on the additional pixel activation line 102b, while the pixel activation signal is not selected to be carried on the additional pixel activation line 102b. For example, the timing switch 128 can be switched in a fourth switching state that can conduct the wireless communication signal 114 to be carried through the additional pixel activation line 102b. Further, the second switching state of the timing switch 128 can facilitate isolation of the display controller 110 from the wireless communication signal 114. The third switching state of the timing switch 128 can facilitate the pixel activation signal not being selected to be carried on the additional pixel activation line 102b, while the wireless communication signal 114 is selected to be carried through the additional pixel activation line 102b.

Next, as shown in the example of FIG. 8, at block 724 the wireless communication signal can be multiplexed over the additional pixel activation line based on the wireless communication signal frequency. For example, the frequency multiplexer 124 as shown in the example of FIG. 1 can frequency multiplex the wireless communication signal 114 over the additional pixel activation line 102b based on the wireless communication signal frequency. Further, the frequency multiplexer 124 can facilitate isolating the wireless communication signal 114 from the display controller 110, based on the wireless communication signal frequency.

Next, as shown in the example of FIG. 8, at block 726 the wireless communication signal can be coupled through the pixel activation line at a fourth time that is different than the third time. The first, second, third and fourth times can all be different from one another. For example, as shown in the example of FIG. 1, the wireless communication signal 114 can be coupled from the NFC RF integrated circuit (IC) transmitter and receiver (TX/RX) 120 and through the additional pixel activation line 102b at the fourth time.

Next, as shown in the example of FIG. 8, at decision block 728 it is determined whether to end the cycle of visual display and wireless communication signal transmission. For example, if a control input registered at a time determines that the cycle is not to end at that time, then flow execution transfers to block 701 shown in FIG. 7. However, if a control input registered at that time determines that the cycle is to end at that time, then after block 728, the example method 700 can end.

Figure 9:
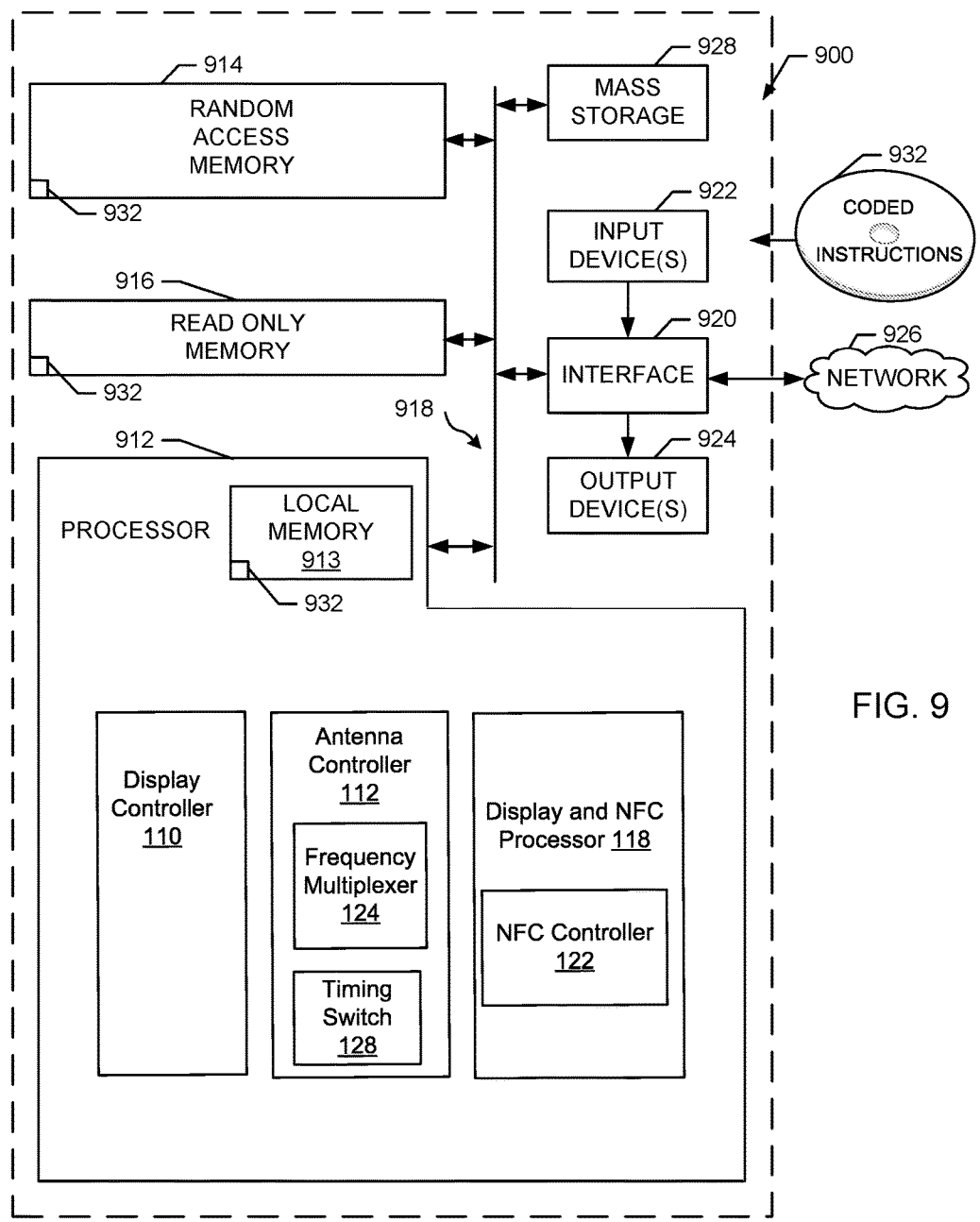
FIG. 9 is a block diagram of an example processing platform capable of executing the example machine-readable instructions of FIGS. 7-8.

FIG. 9 is a block diagram of an example processing platform 900 capable of executing the example machine-readable instructions of FIGS. 7-8 to implement the elements, processes and/or devices illustrated in FIGS. 1-6. The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The processor 912 can implement example display controller, example antenna controller 112 and example display and NFC processor 118. Example antenna controller 112 can include example frequency multiplexer 124 and example timing switch 128. Example display and NFC processor 118 can include NFC controller 122.

The processor 912 of the illustrated example includes a local memory 913 (e.g., a cache), and executes instructions to implement the example operations of this disclosure. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface. In the illustrated example, one or more input devices 922 are connected to the interface circuit 920. The input device(s) 922 permit(s) a user to enter data and commands into the processor 912. The input device(s) can be implemented by, for example, an audio sensor, a microphone, a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor. The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include flash devices, floppy disk drives, hard drive disks, optical compact disk (CD) drives, optical Blu-ray disk drives, RAID systems, and optical digital versatile disk (DVD) drives. Coded instructions 932 representative of the example machine readable instructions of FIGS. 7-8 may be stored in the mass storage device 928, in the volatile memory 914, in the non-volatile memory 916, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A wireless communication apparatus comprising:
a pixel array including a first display pixel and a second display pixel, the first display pixel including a liquid crystal display (LCD) cell in circuit with a transistor and a pixel activation voltage common line;
a display controller;
a pixel activation line in circuit with the display controller to carry a display activation signal from the display controller to the pixel array, the display activation signal to activate visual display of at least one of the first display pixel or the second display pixel;
a frequency multiplexer to multiplex a wireless communication signal and the display activation signal for transmission via the pixel activation line; and
an antenna controller to transmit the wireless communication signal through the pixel activation line and the pixel activation voltage common line.

2. The wireless communication apparatus as defined in claim 1, in which the display controller is to communicate with the pixel activation line via the frequency multiplexer to activate visual display of the at least one of the first display pixel or the second display pixel in response to the display activation signal, the display activation signal having a display activation signal frequency.

3. The wireless communication apparatus as defined in claim 2, wherein the frequency multiplexer is to multiplex the display activation signal between the display controller and the pixel activation line based on the display activation signal frequency.

4. The wireless communication apparatus as defined in claim 1, wherein:
the display activation signal has a display activation signal frequency;
the wireless communication signal has a wireless communication signal frequency; and
the wireless communication signal frequency is higher than the display activation signal frequency.

5. The wireless communication apparatus as defined in claim 1, further including a timing switch to select the display activation signal for transmission on the pixel activation line when the at least one of the first display pixel and the second display pixel is to be activated.

6. The wireless communication apparatus as defined in claim 5, further including a timing switch to select the wireless communication signal for transmission on the pixel activation line while the display activation signal is not selected by the timing switch.

7. The wireless communication apparatus as defined in claim 1, further including a planar pixel array substrate, the pixel array including the first display pixel and a first additional display pixel disposed on the planar pixel array substrate, the pixel activation line disposed on the planar pixel array substrate between the first display pixel and the first additional display pixel.

8. The wireless communication apparatus as defined in claim 7, including an additional pixel activation line in circuit with the first additional display pixel to activate visual display of the first additional display pixel, the antenna controller to couple the wireless communication signal through the additional pixel activation line.

9. The wireless communication apparatus as defined in claim 1, wherein the wireless communication apparatus is wrist wearable.

10. The wireless communication apparatus as defined in claim 1, wherein the pixel activation line has a resistivity of less than one ohm per meter.

11. The wireless communication apparatus as defined in claim 1, further including a touchscreen over the pixel array.

12. A wireless communication apparatus comprising:
a display stack including a liquid crystal display (LCD) cell in circuit with a pixel activation voltage common line;
a pixel activation line in circuit with the display stack, the pixel activation line to carry a display activation signal to activate visual display of the LCD cell;
a frequency multiplexer to multiplex an NFC signal and the display activation signal over the pixel activation line;
a touch sensor; and
an antenna controller to transmit the NFC signal through the pixel activation line and the pixel activation voltage common line.

13. The wireless communication apparatus as defined in claim 12, wherein the display stack includes a pixel including the LCD cell.

14. The wireless communication apparatus as defined in claim 13, wherein the pixel activation line is to activate the pixel in a first time period and to transmit the NFC signal in a second time period, the first time period not overlapping the second time period.

15. A method of operating a display, the method comprising:
multiplexing a display activation signal and a wireless communication signal to be transmitted over a pixel activation line, the pixel activation line in circuit with a display controller, a frequency multiplexer, and a display pixel;
in response to the multiplexing, transmitting the display activation signal via the pixel activation line to activate visual display of the display pixel at a first time; and
in response to the multiplexing, transmitting the wireless communication signal via the pixel activation line and a pixel activation voltage common line at a second time different from the first time.

16. The method as defined in claim 15, further including controlling a timing switch to select the display activation signal when the display pixel is to be activated.

17. The method as defined in claim 16, further including controlling the timing switch to select the wireless communication signal.

* * * * *